March 11, 1924.
E. SCHELLING
MACHINE FOR BINDING SAUSAGES
Filed Feb. 26, 1923     3 Sheets-Sheet 2
1,486,460
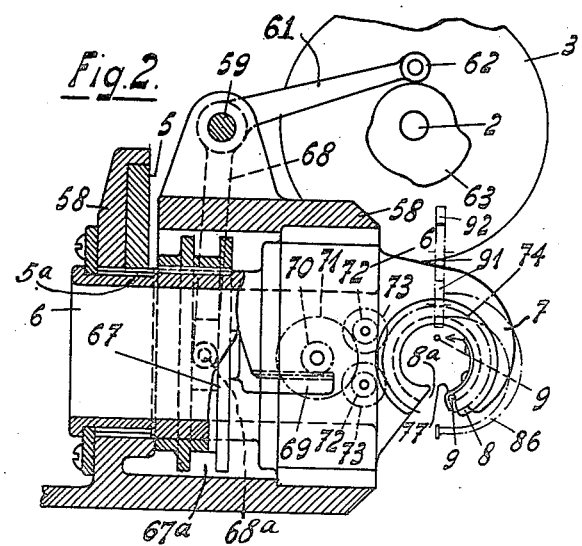
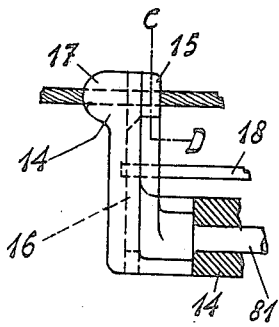
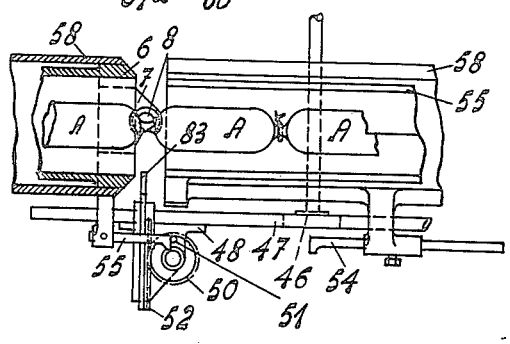
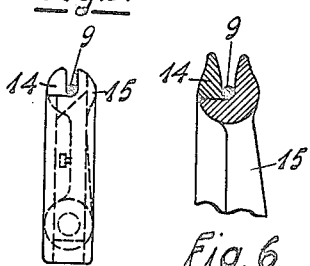
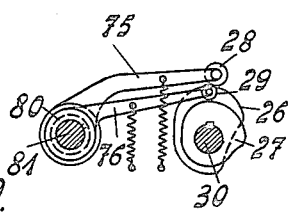
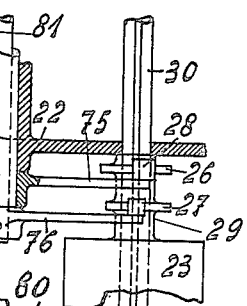
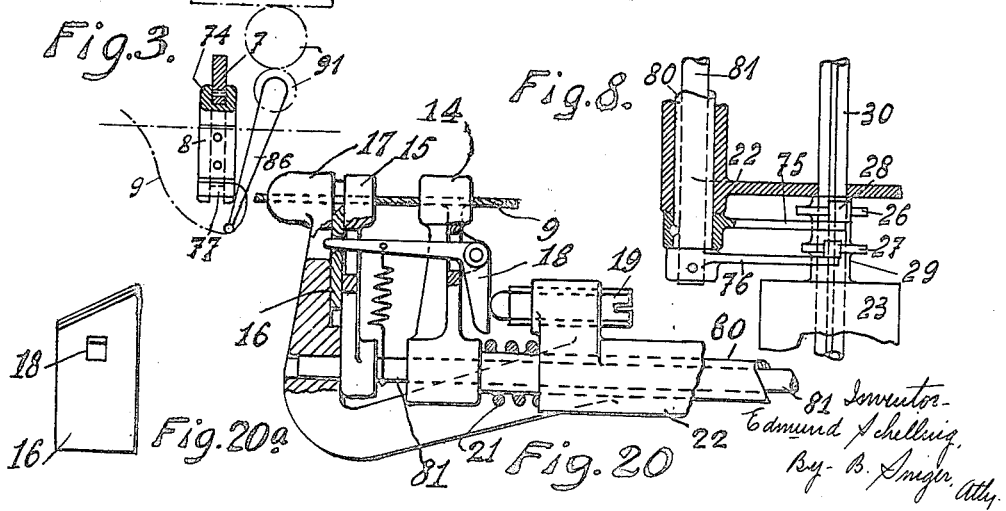
Inventor
Edmund Schelling
By B. Singer Atty.

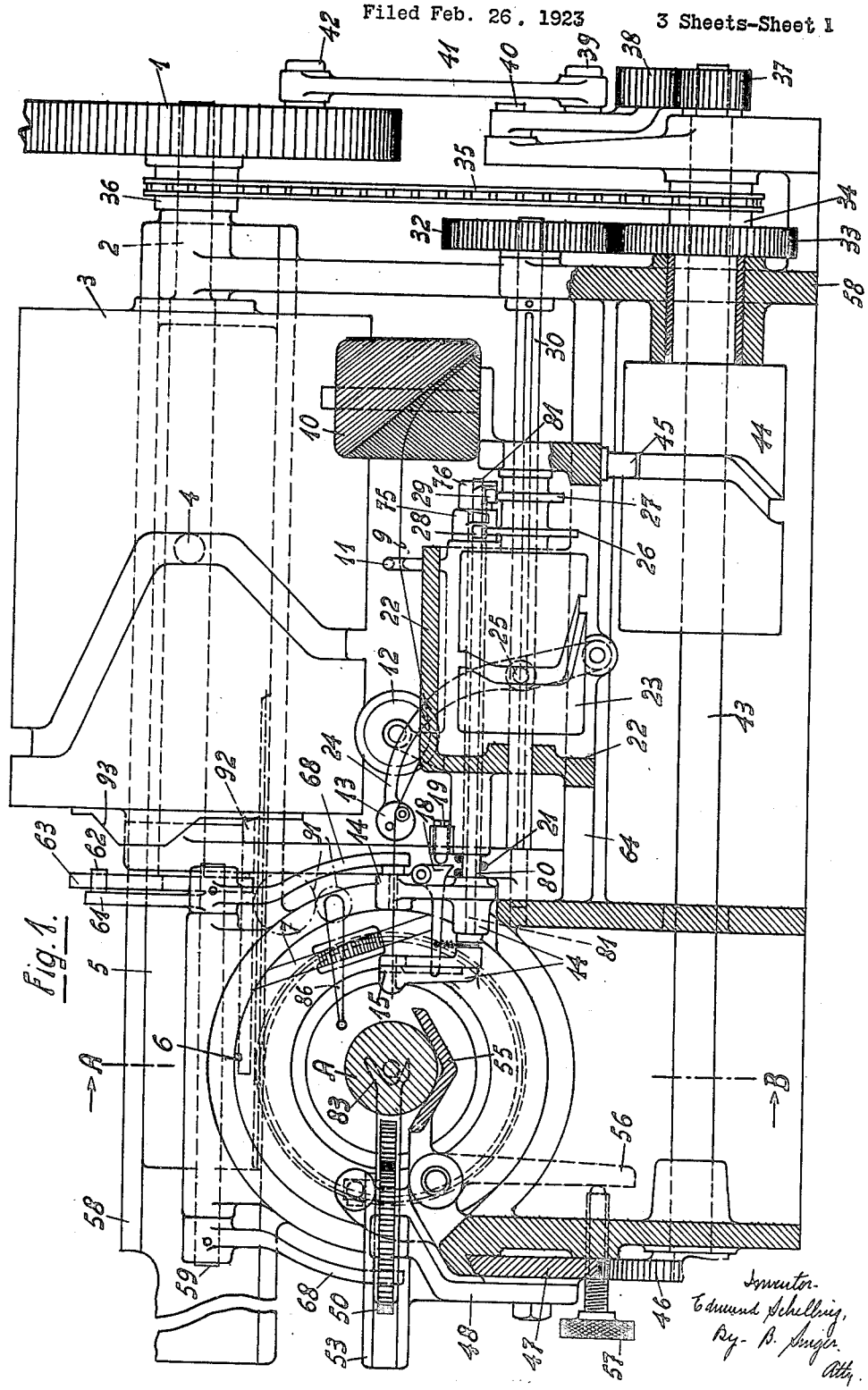

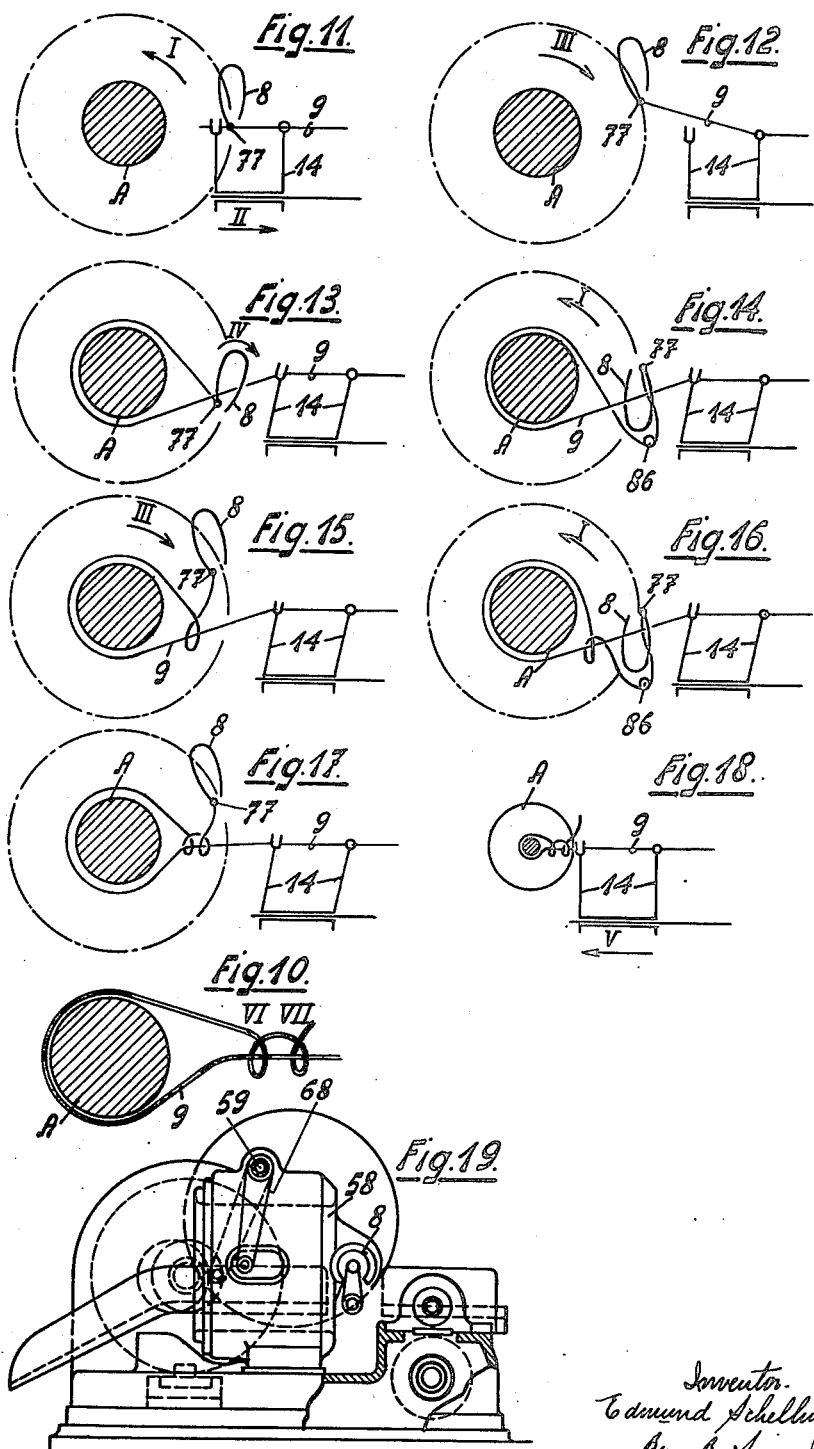

Patented Mar. 11, 1924.

1,486,460

UNITED STATES PATENT OFFICE.

EDMUND SCHELLING, OF DIETIKON, SWITZERLAND.

MACHINE FOR BINDING SAUSAGES.

Application filed February 26, 1923. Serial No. 621,370.

*To all whom it may concern:*

Be it known that I, EDMUND SCHELLING, a citizen of the Swiss Confederation, residing at Oberdorfstrasse 1090, Dietikon, Canton Zurich, Switzerland, have invented certain new and useful Improvements in Machines for Binding Sausages, of which the following is a full, clear, and exact description.

The invention relates to a sausage binding machine that is a machine by means of which a cord may be passed round the skin filled with the stuff to form a sling, to form a knot and draw it tight in order to get sausages closed at the ends. The invention aims to provide a machine which will do the work which had to be done by hand by skilled workmen in the same perfection as has been attained by the best trained men at shorter time.

A further object is to provide a machine of such class which is automatically working, needing no or very little supervision and demanding no skilled labour.

With the foregoing and other objects in view, the invention consists in the novel construction, combination, and arrangement of parts hereinafter more specifically described and illustrated in the accompanying drawings, wherein is shown the preferred embodiment of the invention in a diagrammatical manner, but it is to be understood that changes, variations, and modifications can be resorted to which come within the scope of claims hereunto appended.

In describing the invention in detail reference is had to the accompanying drawings, wherein like reference characters denote corresponding parts throughout the several views and in which—

Fig. 1 is a side elevation of the machine;

Fig. 2 is a section on line A—B of Fig. 1

Fig. 3 is a detail section showing the rotary shuttle holding the cord and a lever cooperating therewith.

Fig. 4 shows a gripping device of the cord in side elevation.

Fig. 5 is an end thereof and

Fig. 6 is a section on line C—D of Fig. 4.

Fig. 7 illustrates that portion of the machine which is used for parting two consecutive sausages.

Figs. 8 and 9 show the cams and levers actuated thereby to operate the gripping device for the cord.

Fig. 10 illustrates the knot made by the machine before the cord is drawn tight.

Figs. 11 to 18 show in a diagrammatical manner the working of the rotary shuttle while forming a knot and the gripping and cutting device cooperating therewith.

Fig. 19 is an end view of the machine shown on a smaller scale.

Fig. 20 is a detail view front elevation showing the cutter 167 and cooperating mechanism.

Figure 20ª is a detail elevation of said cutter.

The machine shown comprises a base 58 in which a shaft 2 is rotatably mounted. The shaft 2 is driven by a motor not shown in the drawings by means of a gear 1 keyed to shaft 2. On the latter a cylindrical drum 3 is fixed having a groove on its circumference into which a pin 4 projects. The pin 4 is fast with a slide 5 slidably mounted in a horizontal groove of base 58. The slide 5 is provided with a rack 5ª engaging a toothed sleeve 6 (Fig. 2) rotatably mounted in the base 58. Suitable means are provided to prevent axial displacement of the sleeve 6. On the face of sleeve 6 a plate 7 is arranged protruding in axial direction. In this plate 7 a ring-shaped shuttle 8 is rotatably mounted. The shuttle is provided with a radial slot 8ª and with a blade spring 77 adapted to press the end piece of the cord 9 onto a face of the shuttle 8. To rotate the shuttle 8 two toothed gears 73 are rotatably mounted on the sleeve 6 both being in mesh with a toothed ring 74 fixed on the shuttle 8. In any position of the shuttle 8 at least one of the gears 73 is in engagement with the shuttle and the latter cannot stop. The two gears 73 are rigidly connected to pinions 72 which are in mesh with a spur wheel 71. The wheel 71 is fixed to a pinion 70 which is in mesh with a rack 69 rigidly connected to a sleeve 67 slidably mounted on the sleeve 6. The sleeve 67 is provided with a circular groove 67ª. Two arms 68 fixed to a shaft 59 embrace the sleeve 67 and engage the said circular groove by means of two blocks 68ª sliding in the said groove. The shaft 59 is set at a right angle to the axis of the sleeves 6 and 67, it is rotatably mounted in the base 58 and carries an arm 61 with roller 62 running on a cam 63 fixed to shaft 2. If the shaft 2 rotates the sleeve 67 is moved on the sleeve 6 in the direction of its axis and the rack 63 rotates the shuttle 8 by means of the intermediate gears 70, 71, 72 and 74. The stuffed skin A is fed by well known means (not shown in the drawings) through the sleeve 6 as it rests on one arm 55 of an angular lever pivoted on the base 58. The second arm 56 rests on an adjusting screw 57 screwed in the wall of base 58 by means of which the position of the sausage A may be adjusted. The cord 9 by means of which the sausage is bound is taken from a ball 10. The cord 9 passes through an eyelet 11 over a braking roller 12 and a guide 13 to a gripping device 14, 15. All the parts 10 to 15 are mounted on a carriage 22 slidably mounted in the base 58. The part 14 of the gripping device is provided with an eyelet through which the cord 9 passes and is arranged in such a manner that the cord 9 is kept therewith in the path of the shuttle 8 which catches the cord held by the gripping device 14, 15 by means of the spring 77 as described later on.

To move the carriage 22 and to operate the cord feeding elements a steering drum 44 is provided. The drum 44 is fixed on a sleeve rotatably mounted on the shaft 43. The sleeve carries a chain gear 34 which is driven by means of a chain 35 and chain wheel 36 from shaft 2. The drum 44 is provided with a steering groove at its circumference into which projects a pin 45 of the carriage 22. By rotating the drum 44 the carriage 22 is moved to and fro in guide grooves 64 and over a shaft 30 rotatably mounted in the base 58 and driven from the chain gear 34, by means of two spur wheels 32, 33 meshing with each other. In the carriage 22 a cylinder 23 is rotatably mounted which cylinder is slidably arranged on the shaft 30 and is rotated by said shaft 30 by means of a key. The cylinder 23 is provided with a guide groove into which a pin 25 projects. Pin 25 is fixed on the cord tensioning lever 24 fulcrumed at the base 58 and carrying the thread guide 13. On rotation of the cylinder 23 the lever 24 is swung up and down drawing the cord with it and tightening the sling and the knot made on the sausage A as described hereinafter.

As the gripping device for the cord 9 is moved to and fro together with the carriage 22 the parts 14 and 15 thereof are actuated by means of cam disks 26, 27 mounted within the carriage 22 on the shaft 30. Said cams 26, 27 swing the gripping device 14, 15 as a whole at a right angle to the path of travel of carriage 22 to bring the cord 9 in or out of the path of shuttle 8 and move moreover the parts 14, 15 with reference to each other to release the cord 9 or to grip it. Part 14 of the gripping device is operated by the cam 26. On cam 26 rests a roller 28 mounted on a lever 75 fastened to a hollow shaft 80 journalled in the carriage 22. The part 15 of the gripping device is actuated by the cam 27. On cam 27 runs a roller 29 mounted on a lever 76 fixed to a shaft 81 rotatably mounted in said hollow shaft 80. The upper ends of the parts 14, 15 form jaws of a clip Figs. 4, 5 and 6, between which the cord 9 may be firmly held.

On the part 14 a knife 16 is slidably mounted by means of which the cord 9 may be cut, after the knot has been formed on the sausages A. The knife 16 rests on one arm of a double armed lever 18 pivoted on part 14 of shaft 80, the other arm of which resting on a stop 19 of carriage 22. The shafts 80, 81 are slidable in their axial direction in the carriage 23 and they are moved in this direction with reference to the carriage 22 as soon as the knot has been formed. The shafts 80, 81 are moved against the action of a coiled spring 21, whereby the lever 18 is moved lifting the knife 16 and cutting the cord 9. The cutting is effected as soon as the carriage reaches its foremost position having tightened the sling round the sausage A and formed the knot. To form the knot a lever 86 to steer the cord is necessary co-operating with the shuttle as described later on. Lever 86 is fast on a shaft journalled in the base 58 and carrying a toothed pinion 91. A rack 92 is in mesh with said pinion 91, the rack 92 being actuated by a cam on the shaft 2.

If a knot has been formed the sausage A has to be shifted for about its length. A fork 83 is provided adapted to pass in the gap formed by the knotting. The fork 83 is slidably mounted in a slide 47 (Fig. 1) and is moved at a right angle to the sausage A by means of a toothed gear 50 engaging a rack 52 fixed to the fork 83. The gear 50 is journalled on an arm 48 fixed to the slide 47, which slide is movably arranged in guides of the base 58. A gear 46 meshing with a rack on the slide 47 moves it to and fro in the direction of the sausage A. The gear 46 is keyed on to a shaft 43 journalled in the base 58 and carrying at its free end a toothed gear 37. A toothed segment 38 is in mesh with said gear 37, the segment 38 is rotatably mounted on a pin 40 of the base 58 and is swung to and fro by a crank pin 42 of gear 1. A connecting rod 41 connects said crank pin 42 with a pin 39 of the segment 38. The gear 1 when rotating turns shaft 43 alternately in one and the other direction shifting thereby slide 47 to and fro and moving the fork 83 to and from the sausage A. The movements of the fork 83 are limited by adjustable stops 54, 55 against which a pin 51 fixed to gear 50 strikes at the end of the stroke of the slide 47.

The machine works as follows: The knot to be formed on the sausage A is shown in Fig. 10 when still loose. To form this knot the cord 9 is passed over the guide 13 and is placed between the jaws of the parts 14, 15 (Figs. 1, 4, 5, 6). The shuttle 8 is above the cord 9 in the position shown in Fig. 1. The sleeve 6 and therewith the plate 7 with shuttle 8 is now moved in the direction of the hands of the clock and the cord 9 passes now below the spring 77 of the shuttle 8 and is held thereby. (Fig. 11.) The sleeve 6 returns now slightly in the direction of the arrow I and in the meanwhile the gripping device 14, 15 moves out of the path of plate 7 in the direction of arrow II. The rotation of the sleeve 6 is now again reversed and the sleeve rotating now in the direction of arrow III Fig. 12 making a little more than a full turn round the sausage A until the shuttle 8 attains the position shown in Fig. 13. All this time the shuttle 8 did not turn around its proper axis, but the gripping device 14, 15 has been slightly tilted, around shaft 80 in such a manner that the cord 9 could pass through the slot of shuttle 8 into the position shown in Figs. 2 and 13 into the free space of the shuttle. Now the sleeve 6 is set to rest and the shuttle 8 is rotated in the direction of arrow IV (Figs. 13 and 14) winding thereby the end-piece of the cord 9 round that portion thereof passing through the shuttle 8. To form the sling denoted in Fig. 10 by VI it is necessary to draw the cord 9 into the position shown in Fig. 14, which is effected by the lever 86. Lever 86 swings downwards as soon as the shuttle 8 starts its rotary movement and after a full turn of the shuttle 8 the first sling VI (Fig. 10) is formed. Sleeve 6 is now rotated for a short distance in the direction of arrow I Fig. 14 and is returned again in the direction of arrow III (Fig. 15) until the shuttle 8 assumes the position shown in Fig. 13. The shuttle 8 is again rotated in the direction of arrow IV (Fig. 16) and lever 86 is again swung downwardly the second sling VII (Fig. 10) is formed (Fig. 16). Sleeve 6 is rotated to bring shuttle 8 into the position shown in Fig. 17 where it rests. The gripping device 14, 15 is moved against the sausage A (Fig. 18) moving the slings to the left (arrow V Fig. 18.) At the same time the lever 24 swings backwardly drawing the cord 9 with it, whereby the knot is tightened. The gripping device 14, 15 finally rests on the contracted portion of the sausage, while the carriage 22 moves slightly farther, whereby the knife 16 is actuated cutting the cord 9. The gripping device returns to its initial position, the sausage A is shifted for about its length and the machine is now ready to make a second knot. The cams 26, 27 actuate the parts 14, 15 in such a manner, that the cord 9 is loose, when the knot is tightened and is held fast during the other time. The gear 50 actuating the fork 83 is rotated when slide 47 moves to the right Fig. 7 as soon as pin 51 strikes against stop 54 and withdraws the fork from the sausage A. The fork 83 is inserted again in the contracted portion of the sausage as soon as the pin 51 strikes against the stop 55 on the return stroke of the slide 47. To form the contraction a suitable tongue like device may be used to divide the stuff within the skin as the cord when drawn tight would otherwise possibly damage the skin.

What I wish to secure by U. S. Letters Patent is:

1. A machine for automatically binding sausages comprising a rotary sleeve, means to feed the stuffed skin through said sleeve, a ring-shaped shuttle rotatably mounted in said sleeve, a radial slot in said shuttle means to catch and hold the cord, means to rotate said rotary sleeve, and said shuttle in the sleeve, and means for feeding the cord, means to form two slings, and means for tightening the knot for the purpose specified.

2. A machine for automatically binding sausages comprising a rotary sleeve, means to feed the stuffed skin through said sleeve, a ring-shaped shuttle rotatably mounted in said sleeve, a radial slot in said shuttle means to catch and hold the cord a gripping device for holding the cord, means for actuating said gripping device, means for rotating said sleeve and for the shuttle in said sleeve said means co-operating with each other and with the gripping device to form two slings, and means to cut-off the cord substantially as described.

In witness whereof I affix my signature.

EDMUND SCHELLING.